(12) United States Patent
Noorkami

(10) Patent No.: US 7,399,155 B2
(45) Date of Patent: Jul. 15, 2008

(54) FLUID FLOW GUIDE ELEMENT AND FLUID FLOW APPARATUS EQUIPPED THEREWITH

(75) Inventor: Jamshid Noorkami, Wittekamp 3, Hannover (DE) D-30177

(73) Assignee: Jamshid Noorkami, Hannover (DE)

(*) Notice: Subject to any disclaimer, the term of this patent is extended or adjusted under 35 U.S.C. 154(b) by 348 days.

(21) Appl. No.: 11/147,376

(22) Filed: Jun. 8, 2005

(65) Prior Publication Data

US 2005/0226722 A1    Oct. 13, 2005

(51) Int. Cl.
*F01D 1/22* (2006.01)
*F16K 31/12* (2006.01)

(52) U.S. Cl. .................. 415/71; 415/76; 415/119; 415/212.1; 60/262

(58) Field of Classification Search ............ 415/224.5, 415/71, 76, 90, 119, 212.1; 60/262
See application file for complete search history.

(56) References Cited

U.S. PATENT DOCUMENTS

| 3,175,571 | A |   | 3/1965  | Bankert |         |
|-----------|---|---|---------|---------|---------|
| 4,029,430 | A |   | 6/1977  | Fonda-Bonardi |   |
| 4,045,957 | A | * | 9/1977  | DiSabato | ............ 60/262 |
| 4,117,671 | A | * | 10/1978 | Neal et al. | ............ 60/262 |
| 4,686,826 | A | * | 8/1987  | Koshoffer et al. | ...... 60/762 |
| 4,971,768 | A | * | 11/1990 | Ealba et al. | ............ 422/176 |
| 5,110,560 | A | * | 5/1992  | Presz et al. | ............ 422/176 |
| 5,230,656 | A | * | 7/1993  | Paterson et al. | .......... 454/263 |
| 6,213,711 | B1|   | 4/2001  | Muller et al. |      |
| 6,412,283 | B1| * | 7/2002  | Sheoran et al. | ........... 60/770 |
| 6,606,854 | B1| * | 8/2003  | Siefker et al. | ............ 60/262 |

FOREIGN PATENT DOCUMENTS

| DE | 1203232      | 10/1965 |
| DE | 2636524      | 3/1977  |
| EP | 0972128      | 1/2000  |
| WO | WO 03/091578 | 11/2003 |

* cited by examiner

*Primary Examiner*—Igor Kershteyn
(74) *Attorney, Agent, or Firm*—Crowell & Moring LLP

(57) ABSTRACT

A fluid flow guide element (1) constructed, for example, as a diffuser having an inlet opening (2) and an outlet opening (3) whose respective cross-sectional areas differ from one another. Corresponding to the exterior view shown in FIG. 1, the inside wall surface (4) of the fluid flow guide element (1) is provided with spirally arranged recesses (5) and elevations (6) having an inclination (7) relative to a longitudinal axis (8) of the guide element (1). The recesses (5) and/or elevations (6) have a width that increases or decreases steadily between the inlet opening (2) and the outlet opening (3). This facilitates efficient operation of a fluid flow guide element (1) which simultaneously has both a large opening angle and a reduced design length by achieving a more uniform flow or flow profile due to the spiral arrangement of the recesses (5) and elevations (6).

13 Claims, 3 Drawing Sheets

FLUID FLOW GUIDE ELEMENT AND FLUID FLOW APPARATUS EQUIPPED THEREWITH

BACKGROUND OF THE INVENTION

The present invention relates to a fluid flow guide element having an inlet opening and an outlet opening, with structuring provided on an inside wall surface of the fluid flow guide element and equipped with recesses and/or elevations, having a predetermined inclination with respect to the longitudinal axis of the fluid flow guide element in the form of a slope. In addition, this invention relates to a fluid flow apparatus equipped with such a fluid flow guide element.

A fluid flow guide element of this type constructed as a diffuser or a nozzle is already widely used in practice, especially in large-scale industrial plants for energy production and in internal combustion engines.

The diffuser serves to recover kinetic fluid energy, with an increase in the static pressure occurring in the direction of flow. In this case kinetic energy is converted to potential energy. Such an energy conversion is desirable in many technical applications.

The diffuser of a compressor converts the high kinetic energy of the flowing fluid as completely as possible into static pressure at the impeller outlet with a low loss. In the subsonic flow range, the diffuser has the form of a channel whose cross section widens in the direction of flow. The pressure gain achievable in diffuser flow depends on many parameters. It is influenced by the diffuser opening angle as well as by the flow conditions and the boundary layer coverage in the diffuser inlet.

It is known from the boundary layer theory that flows with a pressure increase are at high risk of separation. However, such separation results in high flow losses.

In particular, a sudden widening of cross section results in separation of flow due to the great pressure gradient. Therefore, in practice it is common to use diffusers having a gradual widening of the flow cross section, usually in a conical form. Opening angles of max. 10% are customary.

However, the great design length associated with very small opening angles and the resulting great frictional loss due to wall friction have proven to be disadvantageous.

The occurrence of separation in diffusers depends primarily on the pressure increase and is thus a question of diffuser geometry.

Published German patent application no. DE 12 03 232 discloses a fluid flow guide element having an inlet opening and an outlet opening, in which a structuring provided on an inside wall surface of the fluid flow guide element and formed with recesses and/or elevations has a predetermined inclination designed as a slope relative to the longitudinal axis of the flow guide element. In addition, DE 12 03 232 describes a fluid flow apparatus having a fluid flow guide element whose inside wall surface has a structuring which has recesses or elevations distributed around the inside wall surface having a slope relative to the longitudinal axis. These recesses and elevations have a constant width.

U.S. Pat. No. 3,175,571 describes a fluid flow guide element with which unwanted frictional effects on the inside wall surface of a fluid flow guide element are reduced by providing a spiral arrangement of pockets in which a low viscosity lubricant collects. The recesses and elevations have a constant width.

Additional fluid flow guide elements are also known from U.S. Pat. No. 6,213,711 (=EP 972,128), WO 03/091578 and U.S. Pat. No. 4,029,430 (=DE 26 36 524).

In addition, a diffuser design form having inside wall surfaces equipped with transverse ribs to achieve an intense flow separation is also known. This should reshape the velocity profile along the entire channel and improve the efficiency of diffuser flow due to the intense separation of flow.

SUMMARY OF THE INVENTION

It is therefore an object of the present invention to provide an improved fluid flow guide element.

Another object of the invention is to provide a fluid flow guide element which simultaneously exhibits both increased efficiency and a reduced design length.

A further object of the invention is to provide a fluid flow guide element designed as a diffuser or as a nozzle.

An additional object of the invention is to provide a fluid flow apparatus incorporating a fluid flow guide element according to the invention.

These and other objects are achieved in accordance with the present invention by providing a fluid flow guide element having an inlet opening, an outlet opening and a structuring provided on an inside wall surface thereof, the structuring comprising a plurality of recesses or elevations or both, and the structuring having a predetermined inclination relative to a longitudinal axis of the fluid flow guide element, wherein the inlet opening and the outlet opening have respective cross-sectional areas which differ from one another, and the recesses and elevations each have a width which increases or decreases steadily between the inlet opening and the outlet opening, whereby the fluid flow guide element forms a diffuser or a nozzle.

In accordance with further aspects, the objects are also achieved by providing a fluid flow apparatus comprising a fluid flow guide element having a structured inside wall surface, the structured inside wall surface comprising recesses or elevations or both which are distributed around the inside wall surface and are inclined relative to a longitudinal axis of the guide element, the guide element having an inlet opening and an outlet opening having different cross-sectional areas, and the recesses or elevations or both each having a width which increases or decreases steadily between the inlet opening and the outlet opening, whereby the fluid flow guide element forms a diffuser or a nozzle.

In accordance with the present invention, the cross-sectional areas of the inlet opening and the outlet opening differ from one another, and the fluid flow guide element is constructed as a diffuser or a nozzle, wherein the recesses or elevations have a steadily increasing or decreasing width between the inlet opening and the outlet opening.

This invention is based on the finding that the fluid flow guide element designed as a diffuser or nozzle with a large opening angle can be constructed without any loss of efficiency if a spiral is induced in the flow through the structuring. The improvement in efficiency is based on making the flow more uniform in its passage through the fluid flow guide element. The less uniform the oncoming flow, the greater the improvement in efficiency. One possible explanation for this surprising effect of improved efficiency, which is unexpected for those skilled in the art, might be the thinner boundary layer, because the exchange of momentum with the outer flow surfaces is improved due to the spiral flow component, so that separation at the wall occurs only at larger opening angles. The increase in the resulting shearing forces leads to a homogeneous distribution of the fluid and the temperature within the fluid flow guide element.

In accordance with the invention, this creates a circumferential velocity component which increases the production of turbulence at the inside wall surface and suppresses separation tendencies. In addition, this effect leads to a homogenous distribution of fluid particles because the shearing force is optimized. Furthermore, the circumferential component leads to a homogeneous distribution of the flow.

According to one especially advantageous embodiment of the present invention, the recesses or elevations are arranged in the form of a spiral on the inside wall surface. Therefore, the desired rotation about the central longitudinal axis of the fluid flow guide element is induced in the incoming fluid flow without any risk of separation of flow at the same time. The slope or inclination of the recesses or elevations depends essentially on the parameters of the oncoming flow.

The recesses or elevations might be arranged only in some sections, e.g., in the area of the inlet opening. However, an embodiment in which the recesses or elevations are provided continuously between the inlet opening and the outlet opening is particularly suitable in practice, so that the rotational movement can occur especially effectively and the possibility of flow separation within the fluid flow guide element is ruled out.

The recesses or elevations may be formed by milling grooves or cuts in the inside wall surface or may be arranged in the form of ribs on the otherwise smooth inside wall surface. However, an embodiment in which the recesses or elevations have a steady course in the cross-sectional plane of the fluid flow guide element is particularly effective. In this way, in particular an unwanted flow separation is prevented; according to information available so far, such a flow separation leads to flow losses and thus a reduced efficiency.

In accordance with another modification which is especially promising, the recesses or elevations between the inlet opening and outlet opening have a steady angle of slope or inclination to thereby prevent in particular sudden changes or interruptions in the recesses or elevations and the associated occurrence of fluid flow on edges or boundary sections.

It has also proven to be of particular practical relevance when the recesses or elevations are arranged in a uniform distribution around the inside circumference of the inside wall surface and symmetrically with respect to the central longitudinal axis, therefore achieving a uniform rotational profile over the cross section of the flow guidance element and resulting in a further improvement in efficiency.

Likewise, to achieve an optimum fitting of flow over the cross section of the flow guidance element, it has proven to be particularly advantageous if the recesses or elevations have corresponding dimensions in the cross-sectional plane so that differences or deviations due in particular to geometry are ruled out.

To do so, the structuring may also be designed to have recesses or elevations composed of circular segments, whereby in particular the differences in slope are constant. Local pressure differences may thus be ruled out in an optimum manner.

The recesses or elevations may be continued into the inlet opening or the outlet opening. However, an embodiment in which the inlet opening or the outlet opening has a circular cross sectional area is of particular practical relevance to thereby greatly simplify the adaptation to existing fluid flow guide elements, e.g., pipe connections. The structuring in particular directly follows the circular cross-sectional surface of the inlet opening or the outlet opening.

Depending on its basic shape, the fluid flow guide element could be constructed as a conical diffuser or a conical nozzle. However, another advantageous embodiment of this invention is achieved when the fluid flow guide element is designed as a ring diffuser.

The further object of this invention is achieved with a fluid flow apparatus, in particular a turbo machine having a fluid flow guide element whose inside wall surface has structuring with recesses or elevations distributed around the inside wall surface having a slope relative to the longitudinal axis, with the flow guidance element being constructed as a diffuser or a nozzle and its inlet opening and outlet opening having different cross-sectional areas, with the recesses or elevations having a steadily increasing or decreasing width between the inlet opening and the outlet opening.

As a result of the spiral flow induced due to the recesses or elevations, the oncoming flow is made more uniform, thus permitting in particular significant improvements in efficiency in comparison with conventional diffusers. It is thus possible here to rely on existing designs in known fluid flow systems to an unlimited extent so that the flow guidance element is also suitable for use as a replacement element in existing systems. For example, the fluid flow apparatus may be designed as an internal combustion engine.

BRIEF DESCRIPTION OF THE DRAWINGS

This invention allows various embodiments. To further illustrate the basic principle, the invention will be described in further detail hereinafter with reference to illustrative preferred embodiments shown in the accompanying drawing figures, in which.

DETAILED DESCRIPTION OF PREFERRED EMBODIMENTS

Figure 1:
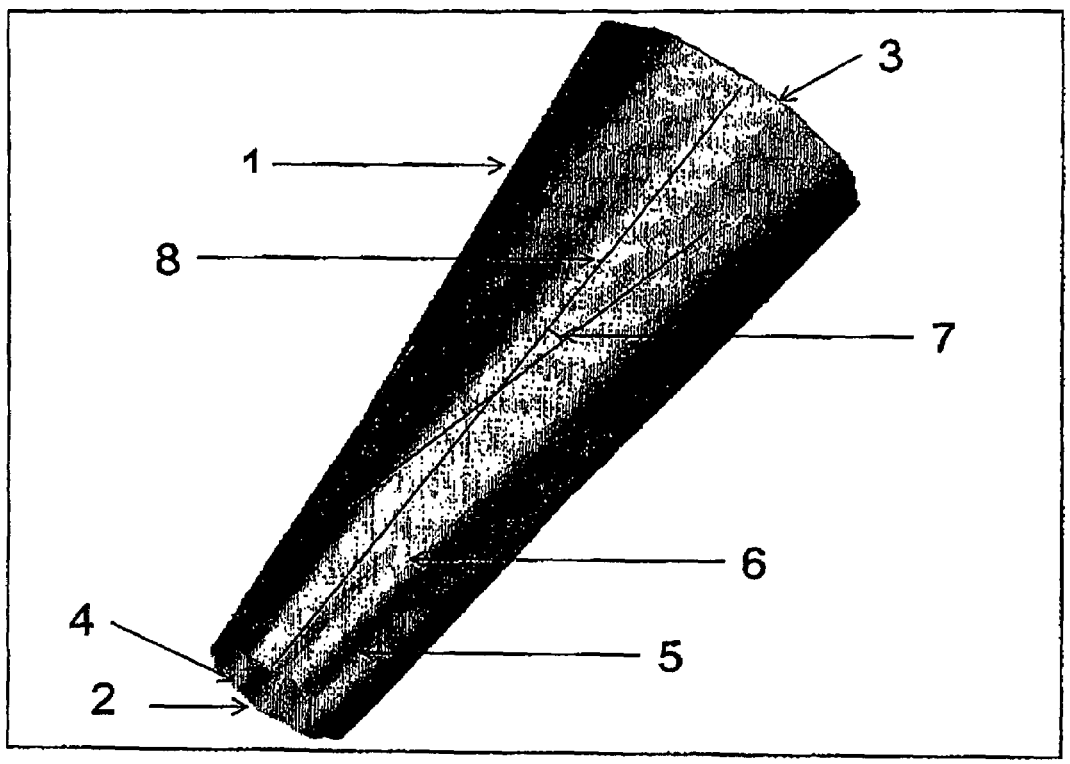
FIG. 1 is a perspective view of a fluid flow guide element according to the invention.

FIG. 1 shows a perspective view of a fluid flow guide element 1 according to the invention, constructed in particular as a diffuser. The fluid flow guide element 1 has an inlet opening 2 and an outlet opening 3, whose cross-sectional areas differ from one another, as shown in greater detail in FIGS. 2 and 3. On the outside there is a structuring which is also reflected on the inside and is arranged in the form of a spiral on an inside wall surface 4 of the fluid flow guide element 1 and is composed of recesses 5 and elevations 6 having a predetermined inclination 7 with respect to a longitudinal axis 8 of the fluid flow guide element 1. The recesses 5 and/or elevations 6 extend continuously and increase in size steadily between the inlet opening 2 and the outlet opening 3, whereby the width b of the recesses 5 and the elevations 6 increases steadily from the inlet opening 2 to the outlet opening 3. This makes it possible to achieve a large opening angle without limiting the efficiency.

Figure 2:
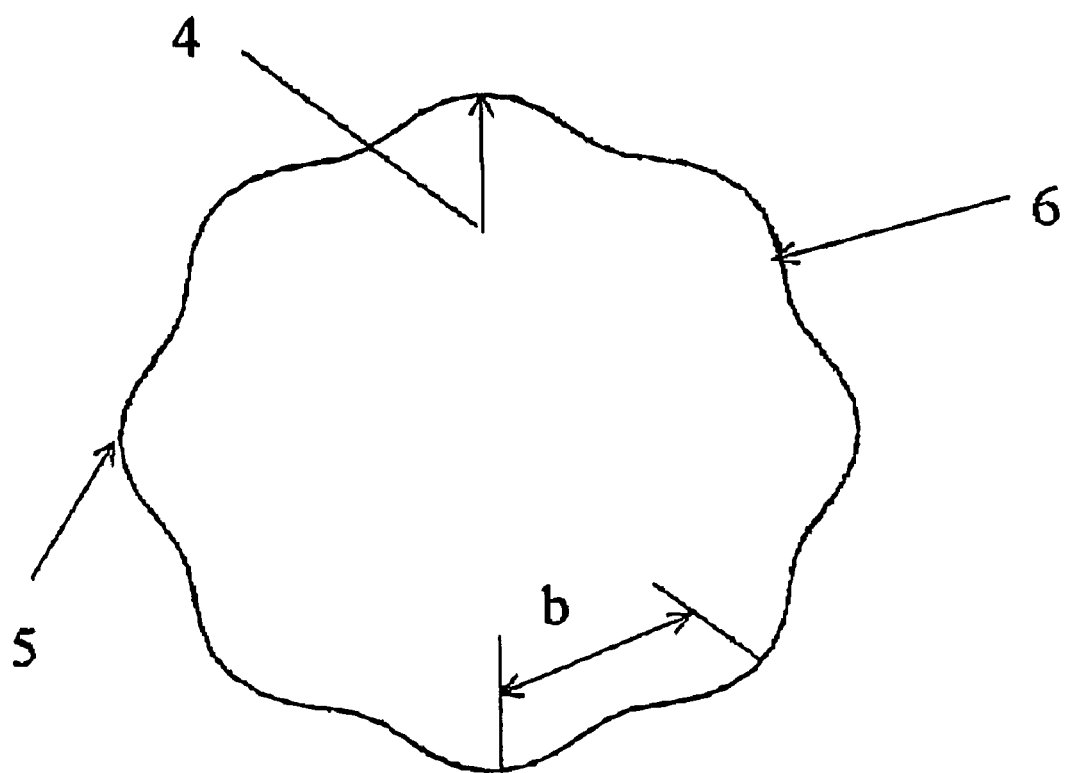
FIG. 2 is a cross-sectional view through the fluid flow guide element illustrated in FIG. 1.
Figure 3:
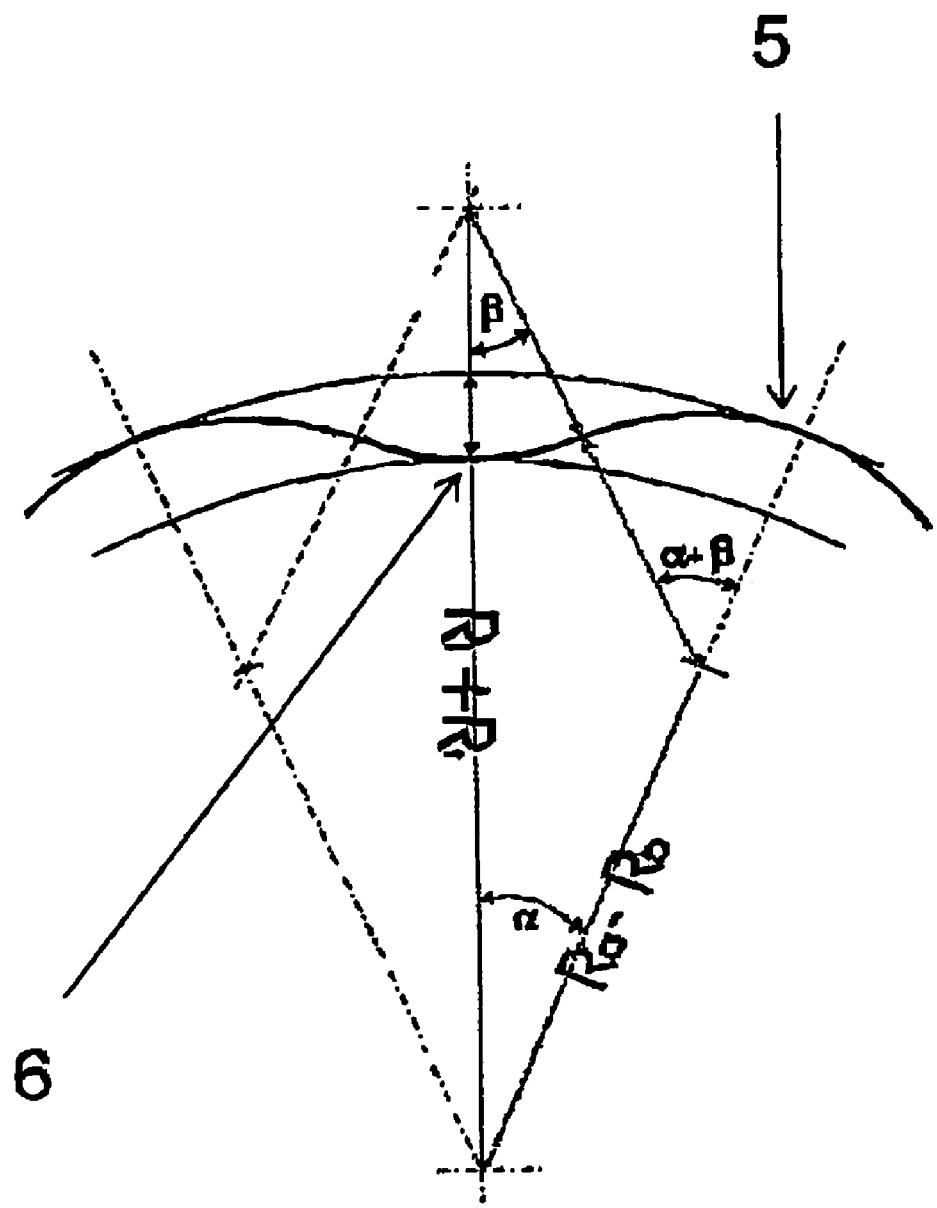
FIG. 3 is an enlarged cross-sectional detail view of the fluid flow guide element of FIG. 1.

FIGS. 2 and 3 each show a cross section through the fluid flow guide element 1 depicted in FIG. 1. FIG. 2 is an enlarged detail view. This figure also shows the recesses 5 and elevations 6 provided on the inside wall surface 4 of the fluid flow guide element 1. The recesses 5 and elevations 6 are equally distributed around the inside circumference of the inside wall surface 4 and have a uniform width b. The recesses 5 or elevations 6 are composed of circular segments which extend between the radius $R_a$ of the outer circumference and the radius $R_i$ of the inner circumference. The angle α corresponds to the ratio of 360° to the number of recesses 5 and elevations 6, while the angle β corresponds to the angular distance between the recess segments.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A fluid flow guide element having an inlet opening, an outlet opening and a structuring provided on an inside wall surface thereof, said structuring comprising a plurality of recesses or elevations or both, and said structuring having a predetermined inclination relative to a longitudinal axis of the fluid flow guide element, wherein the inlet opening and the outlet opening have respective cross-sectional areas which differ from one another, the recesses or elevations or both extend continuously between the inlet opening and the outlet opening, the recesses or elevations or both consist exclusively of circular segments, and the recesses and elevations each have a width which increases or decreases steadily between the inlet opening and the outlet opening, whereby the fluid flow guide element forms a diffuser or a nozzle.

2. A fluid flow guide element according to claim 1, wherein the recesses or elevations or both are spirally arranged on said inside wall surface.

3. A fluid flow guide element according to claim 1, wherein the recesses or elevations or both have a continuous course in a cross-sectional plane of the fluid flow guide element.

4. A fluid flow guide element according to claim 1, wherein the recesses or elevations or both have a steady angle of inclination between the inlet opening and the outlet opening relative to the longitudinal axis of the flow guide element.

5. A fluid flow guide element according to claim 1, wherein the recesses or elevations or both are equally distributed around the circumference of said inside wall surface.

6. A fluid flow guide element according to claim 1, wherein the recesses or elevations or both are arranged symmetrically relative to the longitudinal axis of the guide element.

7. A fluid flow guide element according to claim 1, wherein the recesses or elevations or both have corresponding dimensions in the cross-sectional plane.

8. A fluid flow guide element according to claim 1, wherein at least one of the inlet opening and the outlet opening has a circular cross-sectional area.

9. A fluid flow guide element according to claim 8, wherein both the inlet opening and the outlet opening have circular cross-sectional areas.

10. A fluid flow guide element according to claim 1, wherein said guide element comprises a ring diffuser.

11. A fluid flow apparatus comprising a fluid flow guide element having a structured inside wall surface, said structured inside wall surface comprising recesses or elevations or both which are distributed around said inside wall surface and are inclined relative to a longitudinal axis of the guide element, said guide element having an inlet opening and an outlet opening having different cross-sectional areas, the recesses or elevations or both extend continuously between the inlet opening and the outlet opening, the recesses or elevations or both consist exclusively of circular segments, and said recesses or elevations or both each having a width which increases or decreases steadily between the inlet opening and the outlet opening, whereby the fluid flow guide element forms a diffuser or a nozzle.

12. A fluid flow apparatus according to claim 11, wherein the fluid flow apparatus is an internal combustion engine.

13. A fluid flow apparatus according to claim 11, wherein the fluid flow apparatus is a turbo machine.

\* \* \* \* \*